US012657582B2

(12) United States Patent
Nguyen et al.

(10) Patent No.: US 12,657,582 B2
(45) Date of Patent: Jun. 16, 2026

(54) CONVERTING BRIDGED TOKENS TO NATIVE TOKENS ON A BLOCKCHAIN

(71) Applicant: Circle Internet Group, Inc., New York, NY (US)

(72) Inventors: Long Nguyen, Boston, MA (US); Adrian Soghoian, Brooklyn, NY (US); Boyan Lin, Woodside, CA (US); Marcus Boorstin, Somerville, MA (US); James Hinck, Brooklyn, NY (US)

(73) Assignee: CIRCLE INTERNET GROUP, INC., New York, NY (US)

( * ) Notice: Subject to any disclaimer, the term of this patent is extended or adjusted under 35 U.S.C. 154(b) by 193 days.

(21) Appl. No.: 18/455,398

(22) Filed: Aug. 24, 2023

(65) Prior Publication Data

US 2025/0037119 A1 Jan. 30, 2025

Related U.S. Application Data

(60) Provisional application No. 63/515,910, filed on Jul. 27, 2023.

(51) Int. Cl.
*G06Q 20/38* (2012.01)

(52) U.S. Cl.
CPC ....... *G06Q 20/3825* (2013.01); *G06Q 20/389* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 5,892,900 | A * | 4/1999 | Ginter ..................... | H04L 63/20 726/26 |
| 11,880,836 | B1 * | 1/2024 | Nemethi .............. | G06Q 20/389 |
| 2020/0013027 | A1 * | 1/2020 | Zhu ........................... | H04L 9/50 |
| 2020/0143471 | A1 * | 5/2020 | Jackson ............. | G06Q 20/3678 |
| 2020/0328892 | A1 * | 10/2020 | Gangal ................. | H04L 9/0825 |
| 2021/0241243 | A1 * | 8/2021 | Wiklof .............. | G06Q 20/0655 |
| 2022/0337439 | A1 * | 10/2022 | McCOY .............. | H04L 9/3247 |

(Continued)

OTHER PUBLICATIONS

Multichan.org, "Multichain," retrieved from https://web.archive.org/web/20230607183944/https://docs.multichain.org/getting-started/introduction on Jun. 7, 2023 (Year: 2023).*

(Continued)

*Primary Examiner* — Eduardo Castilho
(74) *Attorney, Agent, or Firm* — Patterson + Sheridan, LLP

(57) ABSTRACT

Certain aspects of the present disclosure provide techniques for converting a bridged token on a blockchain to a native token on the blockchain. An example method generally includes pausing a token bridge between a first blockchain and a second blockchain. Minting privileges on the second blockchain are adjusted such that a designated user is granted privileges to control token minting on the second blockchain and no other users are allowed to control token minting on the second blockchain. It is validated that a quantity of a bridged token has remained unchanged since a freeze time at which the token bridge was paused. Based on validating that the quantity of the bridged token has remained unchanged since the freeze time, the bridged token is converted to a native token existing on the second blockchain.

19 Claims, 4 Drawing Sheets

(56)                References Cited

U.S. PATENT DOCUMENTS

| | | | | |
|---|---|---|---|---|
| 2022/0351186 | A1 | 11/2022 | Quigley et al. | |
| 2023/0006976 | A1* | 1/2023 | Jakobsson | H04L 9/50 |
| 2023/0018175 | A1* | 1/2023 | Kaplan | G06Q 20/02 |
| 2023/0205784 | A1* | 6/2023 | Dusek | G06F 16/2365 |
| | | | | 707/615 |
| 2023/0334470 | A1* | 10/2023 | Beller | G06Q 20/363 |
| 2023/0367776 | A1* | 11/2023 | Padmanabhan | G06F 16/252 |
| 2023/0367788 | A1* | 11/2023 | Grant | H04L 9/50 |
| 2023/0401580 | A1* | 12/2023 | Forson | G06Q 20/4014 |
| 2024/0037537 | A1* | 2/2024 | Kleinman | G06Q 20/1235 |
| 2024/0146554 | A1* | 5/2024 | Shetty | H04L 9/3247 |
| 2024/0202679 | A1* | 6/2024 | Mayerchak | G06Q 20/381 |

OTHER PUBLICATIONS

K.-E. Marstein, A. Chiriac, L. Riley, T. Hardjono and G. Verdian, "Implementing Secure Bridges: Learnings from the Secure Asset Transfer Protocol," 2023 IEEE International Conference on Blockchain and Cryptocurrency (ICBC), Dubai, United Arab Emirates, 2023, pp. 1-9, doi: 10.1109/ICBC56567.2023.1017 (Year: 2023).*

Patrick McCorry et al, "SoK: Validating Bridges as a Scaling Solution for Blockchains," (Year: 2021).*

P. Merrill, T. Austin, J. Thakker, Y. Park and J. Rietz, "Lock and Load: A Model for Free Blockchain Transactions through Token Locking," 2019 IEEE International Conference on Decentralized Applications and Infrastructures (DAPPCON), Newark, CA, USA, 2019, pp. 19-28, doi: 10.1109/DAPPCON.2019.00013 (Year: 2019).*

Cronje, A, "AnyswapV5ERC20.sol" retrieved on May 20, 2021, from https://github.com/connext/chaindata/commits/main/AnyswapV5ERC20.sol (Year: 2021).*

Zhaojun-sh, "Update AnyswapV6ERC20.sol," retrieved on Feb. 25, 2022 from https://github.com/anyswap/chaindata/commits/main/AnyswapV6ERC20.sol (Year: 2022).*

OpenZepellin, "Access control," retrieved from https://web.archive.org/web/20230521044909/https://docs.openzeppelin.com/contracts/4.x/access-control#granting-and-revoking on May 21, 2023, 2023, (Year: 2023).*

Llamarisk, "Cross-Chain Gauges & Ecosystem Assessment: Multichain," retrieved on Mar. 19, 2023 from https://web.archive.org/web/20230319173155/https://cryptorisks.substack.com/p/cross-chain-gauges-and-ecosystem (Year: 2023).*

X. Niu, L. Kong, F. Jin, X. Song, X. Min and Q. Li, "NFT Cross-Chain Transfer Method Under the Notary Group Scheme," 2023 26th International Conference on Computer Supported Cooperative Work in Design (CSCWD), Rio de Janeiro, Brazil, 2023, pp. 996-1001, doi: 10.1109/CSCWD57460.2023.10152551 (Year: 2023).*

PCT/US2024/037500, International Search Report and Written Opinion dated Oct. 2, 2024, 15 pages.

Lucius Fang et al., How to DEFI (Advanced, May 31, 2021, CoinGecko, 289 pages.

Ivanov Nikolay et al., Rectifying Administrated ERC20 Tokens, Sep. 17, 2021, 16 pages.

* cited by examiner

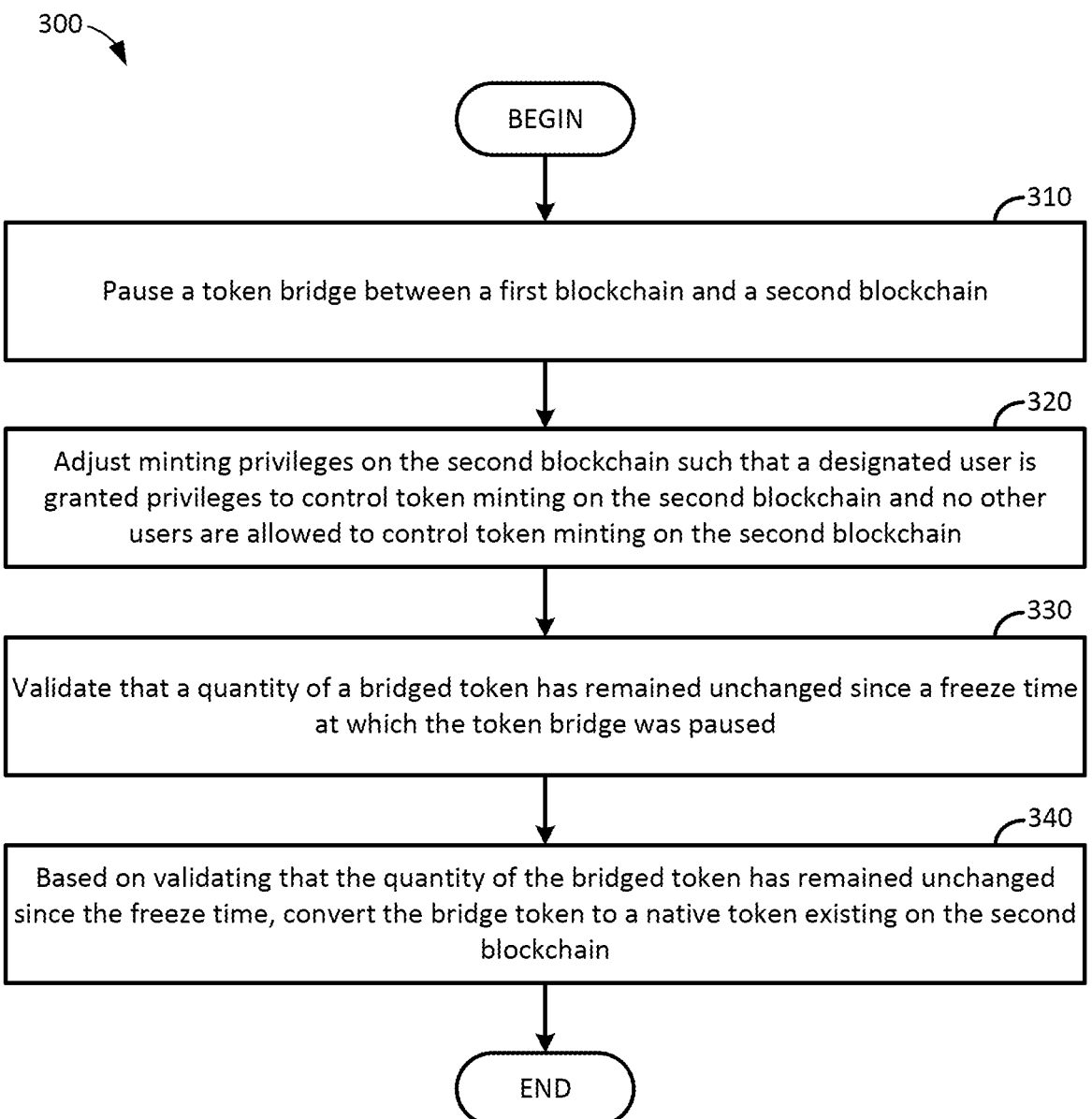

300

BEGIN

310
Pause a token bridge between a first blockchain and a second blockchain

320
Adjust minting privileges on the second blockchain such that a designated user is granted privileges to control token minting on the second blockchain and no other users are allowed to control token minting on the second blockchain 330
Validate that a quantity of a bridged token has remained unchanged since a freeze time at which the token bridge was paused 340
Based on validating that the quantity of the bridged token has remained unchanged since the freeze time, convert the bridge token to a native token existing on the second blockchain

END

FIG. 3

CONVERTING BRIDGED TOKENS TO NATIVE TOKENS ON A BLOCKCHAIN

CROSS-REFERENCE TO RELATED APPLICATIONS

This application claims priority to and benefit of U.S. Provisional Patent Application Ser. No. 63/515,910, entitled "Converting Bridged Tokens to Native Tokens on a Blockchain," filed Jul. 27, 2023, and assigned to the assignee hereof, the entire contents of which are hereby incorporated by reference.

INTRODUCTION

Aspects of the present disclosure relate to transaction processing in blockchain systems to improve processing and resource utilization efficiency.

BACKGROUND

Blockchains can be used in various decentralized systems to provide a ledger of transactions that have occurred within these decentralized systems. Generally, a blockchain may include a chain of blocks, in which the latest block includes some information about a transaction that occurred and a reference to an immediate predecessor block, which may be a hashed value of the previous block. Because the reference to the immediate predecessor block may be a value derived from the immediate predecessor block, verification of the transactions in the blockchain may be performed by ensuring that a hash of a block resolves to the same value as that stored as a reference to the immediate predecessor block in a succeeding block in the blockchain. If there is a mismatch between a computed hash of a block and the hashed value of the block in a succeeding block in the blockchain, validation of the blockchain may fail.

Generally, blockchains may support the use of various tokens that can be used to perform transactions on these blockchains. These tokens may be "native" tokens, or tokens that are mintable and usable on a blockchain, or "bridged" tokens, or tokens that exist on a first blockchain with corresponding tokens existing on a second blockchain. That is, while native tokens may be directly minted and used on a blockchain, the minting and use of a bridged token generally involves the minting of a first token on a first blockchain on which the token is actually a native token, and the minting of a second, corresponding, token, on a second blockchain via a bridge between the first blockchain and the second blockchain.

While the use of bridged tokens on a blockchain may allow for new types of tokens to rapidly be deployed on blockchains for which these new types of tokens are not native tokens, bridged tokens may contribute to fragmentation in a blockchain system. For example, different bridged tokens with a same associated native token on the first blockchain may have the same value, but may not be interchangeable with each other because each version of a bridged token may be associated with a unique issuer and a unique set of smart contracts associating bridged tokens on the second blockchain with native tokens on the first blockchain. Thus, transactions involving bridged tokens may actually involve multiple transactions (e.g., to convert one type of bridged token to a native token or to another type of bridged token), each of which may take some amount of time and compute resources to process on the blockchain. Because each transaction may incur a transaction overhead (also known as a "gas fee") to cover the computational expense involved in performing any transaction, executing multiple transactions in order to convert varying types of bridged tokens to a same type of token for use in an underlying transaction may incur a significant transaction overhead, be computationally expensive, and may delay the completion of the underlying transaction.

Accordingly, techniques are needed to allow for computationally efficient processing of transactions on a blockchain.

BRIEF SUMMARY

Certain embodiments provide a computer-implemented method for converting a bridged token on a blockchain to a native token on the blockchain. An example method generally includes pausing a token bridge between a first blockchain and a second blockchain. Minting privileges on the second blockchain are adjusted such that a designated user is granted privileges to control token minting on the second blockchain and no other users are allowed to control token minting on the second blockchain. It is validated that a quantity of a bridged token has remained unchanged since a freeze time at which the token bridge was paused. Based on validating that the quantity of the bridged token has remained unchanged since the freeze time, the bridged token is converted to a native token existing on the second blockchain.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates example operations for converting bridged tokens to native tokens on a blockchain, according to aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
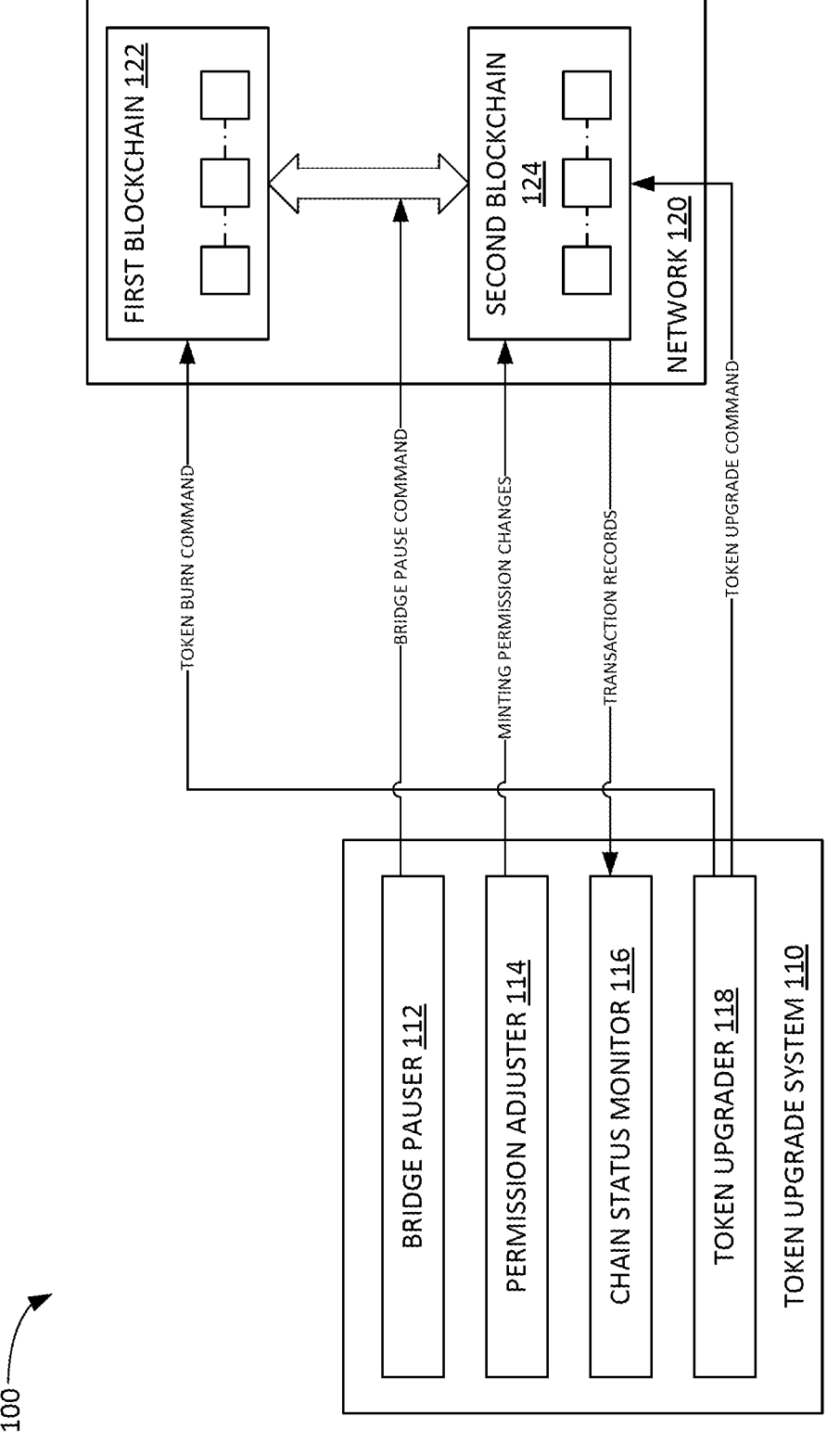
FIG. 1 depicts an example computing environment in which bridged tokens are converted to native tokens on a blockchain, according to aspects of the present disclosure.

Transactions in cryptocurrency systems may be represented as blocks in a blockchain that track a universe of transactions performed using the cryptocurrency system. In these cryptocurrency systems, processed transactions may not be modified at a later date, thus providing an immutable ledger of the transactions performed using the cryptocurrency system.

In some cases, multiple blockchains can be used to record a transaction. A base blockchain, also referred to as a "Layer 1" blockchain, may be a blockchain such as ETHEREUM®, and a blockchain that is "overlaid" on the Layer 1 blockchain, or otherwise configured to work alongside the Layer 1 blockchain, may be referred to as a "Layer 2" blockchain. An example of a Layer 2 blockchain may include the POLYGON® chain. Layer 1 blockchains generally provide a source of truth for a network and may generally be responsible for handling transactions on the Layer 1 blockchain and the Layer 2 blockchain(s) overlaid on the Layer 1 blockchain. Layer 2 blockchains generally allow for various applications to be built on top of a Layer 1 blockchain to extend the functionality of the Layer 1 blockchain, and to extend the functionality of the overall blockchain-based system. However, to maintain consistency between the Layer 1 blockchain and the Layer 2 blockchain(s), various transactions may be committed to both the Layer 1 blockchain and the Layer 2 blockchain(s).

For example, a Layer 1 blockchain may be used to mint tokens, such as cryptocurrency tokens, that may be spent and maintained on the Layer 2 blockchain. To maintain consistency between the Layer 1 blockchain and the Layer 2 blockchain, minted tokens may be recorded on both the Layer 1 blockchain and the Layer 2 blockchain (also known as "bridging" a token from the Layer 1 blockchain to the Layer 2 blockchain). Subsequent transactions that use, but do not destroy, these tokens may be performed on the Layer 2 blockchain, which generally allows for transaction processing to be offloaded from the Layer 1 blockchain to the Layer 2 blockchain and thus reduces the amount of compute resources needed to process transactions on the Layer 1 blockchain. When a token is to be destroyed (or "burned"), the tokens may be destroyed on both the Layer 1 and the Layer 2 blockchains in order to maintain consistency between the records, and thus the number of extant tokens, on the Layer 1 blockchain and the Layer 2 blockchain.

Generally, the use of bridged tokens on a blockchain may allow for rapid deployment of tokens to a blockchain on which these tokens are not native tokens. However, at some point in time, the minting authority associated with the native token which is bridged from a first blockchain to a second blockchain may deploy the token as a native token on the second blockchain. The bridged token and the native token on the second blockchain may represent the same underlying value or object; however, because the bridged token and the native token are different tokens, these tokens may not be used interchangeably. Thus, in order to execute transactions on a blockchain, native tokens may be converted to bridged tokens, bridged tokens may be converted to native tokens, or both native tokens and bridged tokens may be converted into a different token altogether prior to completing a transaction. The conversion of tokens from one type of token to a different type of token, as discussed, generally involves a number of transactions, each of which has a computational overhead and incurs costs to cover such overhead. Further, because each transaction generally involves some amount of time to process and settle, the execution of a transaction may be delayed until various conversion transactions have been completed, leading to potentially significant delays in the completion of any given transaction.

Aspects of the present disclosure provide techniques for converting bridged tokens to native tokens on a blockchain. Generally, in converting bridged tokens to native tokens on a blockchain, a bridge allowing the minting of bridged tokens on a blockchain and corresponding tokens on a source blockchain may be frozen, minting parties having permissions needed to create bridged tokens on the blockchain may have such permissions removed, and a party associated with the native token may receive minting permissions for native tokens on the blockchain. After allowing pending transactions involving the native tokens to be completed, and based on validating that the token supply has not changed since the bridge was frozen, the extant bridged tokens may be converted to a native token. By doing so, aspects of the present disclosure may allow for tokens to initially be deployed as bridged tokens on a blockchain and then converted to native tokens on the blockchain. Thus, tokens may be quickly deployed to new blockchains, and such tokens may be converted to native tokens to minimize fragmentation of these tokens across different blockchains. Further, because tokens can be converted to native tokens, and new native tokens may be directly minted on the blockchain, aspects of the present disclosure may minimize the number of transactions that are performed on a blockchain in order to execute a transaction, as bridged and native tokens need not be converted (either to the other type of token or a different token) before a transaction can be performed. Thus, aspects of the present disclosure may reduce the computational expense incurred in processing transactions involving tokens on a blockchain, reduce power expenditure used in processing such transactions, and accelerate the processing of such transactions.

Example Conversion of Bridged Tokens to Native Tokens on a Blockchain

FIG. 1 illustrates an example computing environment 100 in which bridged tokens are converted to native tokens on a blockchain. As illustrated, computing environment 100 includes a token upgrade system 110 and a network 120.

As illustrated, network 120 generally hosts a first blockchain 122 and a second blockchain 124. In some aspects, the first blockchain 122 may be a Layer 1 (L1) blockchain, and the second blockchain 124 may be a Layer 2 (L2) blockchain. The Layer 1 blockchain is generally a base blockchain, such as ETHEREUM®, and a Layer 2 blockchain may generally be a blockchain that is "overlaid" on the Layer 1 blockchain, or otherwise configured to work alongside the Layer 1 blockchain. An example of a Layer 2 blockchain may include the POLYGON® chain. Layer 1 blockchains generally provide a source of truth for a network and may generally be responsible for handling transactions on the Layer 1 blockchain and the Layer 2 blockchain(s) overlaid on the Layer 1 blockchain. Layer 2 blockchains generally allow for various applications to be built on top of a Layer 1 blockchain to extend the functionality of the Layer 1 blockchain, and to extend the functionality of the overall blockchain-based system.

To establish a bridged token that is upgradeable to a native token on the second blockchain 124, a minting authority associated with the bridged token may deploy a token contract to the second blockchain that can be upgraded from a contract defining a bridged token to a contract defining a native contract on the second blockchain. The contract may be an exact copy of a contract defined a priori for the upgradeability of bridged tokens to native tokens or may be a functionally equivalent version of such a contract. In establishing a bridged token on the second blockchain, a bridge 126 may be established between the first blockchain 122 and the second blockchain 124 that allows for tokens to be bridged between these blockchains.

In some aspects, the contract deployed on the second blockchain 124 to support the upgradability and conversion of a bridged token to a native token on the second blockchain 124 may be a contract that uses the proxy upgrade pattern. In a contract using the proxy upgrade pattern, the contract itself may include a wrapper which serves as a front-end through which external parties (e.g., token upgrade system 110, minting parties (not shown in FIG. 1), or the like) interact with a contract, and a logic component including the programmatic logic that is executed when the contract is invoked. In this example, the logic component of the contract deployed on the second blockchain may be a logic contract that allows for the minting and burning of bridged tokens on the second blockchain 124 and corresponding tokens on the first blockchain 122. A mint operation defined by the logic component may allow for a base token to be minted on a first blockchain 122 and bridged to a second blockchain 124 in order to create bridged tokens on the second blockchain 124. A burn operation defined by the logic component may allow for bridged tokens to be burned by burning the bridged token on the second blockchain 124 and burning a corresponding base token on the first blockchain 122. After the execution of a token minting transaction or a token burn transaction, the number of extant base tokens on the first blockchain 122 should match the number of extant bridged tokens on the second blockchain 124. Generally, after bridged tokens are minted on the second blockchain 124, the bridged tokens may be used in various (non-burn) transactions on the second blockchain 124 without performing corresponding transactions on the first blockchain 122.

Token upgrade system 110 generally allows for tokens to be upgraded, or converted, from a bridged token on a second blockchain 124 to a native token on the second blockchain 124. As illustrated, token upgrade system 110 includes a bridge pauser 112, a permission adjuster 114, a chain status monitor 116, and a token upgrader 118.

To upgrade a token, token upgrade system 110 may initially use bridge pauser 112 to pause the bridging of tokens from the first blockchain 122 to the second blockchain 124 via bridge 126. Generally, in pausing the token bridging operations between the first blockchain 122 and the second blockchain 124, the bridge pauser 112 may enact a token supply lock on the bridge 126 between the first blockchain 122 and the second blockchain 124. By doing so, a steady state may be established so that the token upgrade system 110 (and any parties to whom native token minting authority is to be granted in order to mint native tokens on the second blockchain 124 after bridged tokens are upgraded to native tokens) can ensure that the expected number of tokens exist on the first blockchain 122 and the second blockchain 124. Generally, the expected number of extant tokens on the first blockchain 122 and the expected number of extant bridged tokens on the second blockchain 124 should match. If a mismatch exists between the number of extant tokens on the first blockchain 122 and the number of extant bridged tokens on the second blockchain 124 after accounting for some amount of time to allow pending minting and burning transactions to be finalized, the bridged tokens on the second blockchain 124 should not be upgraded to a native token at this time, and the token upgrade process can be terminated (as discussed in further detail below).

After bridge pauser 112 pauses the bridge 126 between the first blockchain 122 and the second blockchain 124, permission adjuster 114 can adjust minting and burning privileges on the second blockchain 124. Generally, before bridge pauser 112 pauses the bridge between the first blockchain 122 and the second blockchain 124, one or more minting entities may have rights to mint and burn bridged tokens on the second blockchain 124 (and create corresponding tokens on the first blockchain 122 to which the bridged tokens are bridged). However, as part of upgrading a token from a bridged token to a native token on the second blockchain 124, the minting entities that had rights to mint and burn bridged tokens on the second blockchain 124 should not have future rights to mint and burn tokens on the second blockchain after extant bridged tokens have been converted to native tokens. Rather, token upgrade system 110 (and/or another minting entity, not illustrated in FIG. 1, associated with the token upgrade system 110, such as a minting entity controlled by a party controlling token upgrade system 110) should be the sole party having rights to mint and burn (native) tokens on the second blockchain after the upgrade has occurred.

In some aspects, to change permissions associated with minting parties for the second blockchain 124, permission adjuster 114 may receive permissions from the minting parties on the second blockchain 124 to take over control of smart contracts or other contracts defining the token deployed on the second blockchain 124. Permission adjuster 114 generally adjusts various minting privileges on the second blockchain 124 such that the minting parties having permissions or privileges to mint and burn tokens on the second blockchain 124 prior to initiation of a token upgrade process no longer have permissions or privileges to control token minting on the second blockchain. These privileges may include an ownership privilege, a pausing privilege, a rescue privilege that allows for tokens to be recovered and returned to a specified wallet, a master minter privilege that allows for a minting party to be designated as the sole party that can mint tokens or as a lead minter on the second blockchain 124, and a blocklister privilege that controls addresses to which tokens may be transmitted on the second blockchain 124.

Generally, in order for tokens to be upgraded from a bridged token to a native token on the second blockchain 124, token upgrade system 110 or a designated party associated with the party operating the token upgrade system 110 may receive the privileges discussed above. If, as discussed in further detail below, additional parties have been granted privileges to mint tokens on the second blockchain 124 after permission adjuster 114 has adjusted minting privileges on the second blockchain 124 (e.g., after minting, blocking, rescuing, and blocklisting privileges have been transferred to the token upgrade system 110 and/or a minting entity controlled by a party associated with the token upgrade system), it may be determined that a loss of trust event has occurred on the second blockchain. Thus, the upgrade process may be terminated, and permission adjuster 114 can return minting and other privileges to their respective original parties.

Permission adjuster 114 may allow for a party to retain some privileges with respect to bridged tokens on the second blockchain 124 and associated native tokens on the first blockchain 122 in order to effectuate an upgrade of a bridged token on the second blockchain 124 to a native token on the second blockchain 124. For example, to do so, the bridge 126 between the first blockchain 122 and the second blockchain 124 may be designated as a zero-allowance minting party. By designating the bridge 126 as a zero-allowance minting party, the bridge 126 may not be allowed to mint new bridged tokens on the second blockchain 124 and corresponding tokens on the first blockchain 122. The bridge 126, however, may be allowed to burn tokens on the first blockchain 122 as part of the upgrade process to convert a bridged token on the second blockchain 124 to a native token on the first blockchain 122. In being allowed to burn tokens on the first blockchain 122 but not allowed to mint further tokens on the second blockchain 124, the bridge may be used to ensure that the supply of native tokens extant across blockchains does not change during the upgrade process (e.g., such that the number of total extant native tokens before the upgrade is executed on the second blockchain 124 is equal to the number of total extant native tokens after the upgrade is executed on the second blockchain 124).

Chain status monitor 116 generally monitors activity on the first blockchain 122 and the second blockchain 124 to ensure that the second blockchain 124 is in a suitable state in order to upgrade a token from a bridged token to a native token (also referred to as an "upgradable state"). Chain status monitor 116 can monitor the number of extant tokens on the first blockchain 122 and the second blockchain 124 as well as the identities of parties having minting privileges on the second blockchain 124. Monitoring the number of extant tokens on the first blockchain 122 and the second blockchain 124 may allow the token upgrade system 110 to ensure that records are consistent between the two blockchains as a precondition for upgrading bridged tokens to native tokens on the second blockchain 124. Meanwhile, monitoring the identities of parties having minting privileges on the second blockchain 124 may allow the token upgrade system 110 to ensure that the parties that deployed the bridged token on the second blockchain 124 prior to an upgrade process have not attempted to perform malicious actions (e.g., to maintain the existence of bridged tokens, to surreptitiously create new bridged tokens for conversion to native tokens, or the like) during the upgrade process.

Chain status monitor 116 generally monitors the number of extant tokens on the first blockchain 122 and the second blockchain 124 as an off-chain process to minimize transaction overheads that would be incurred if the calculation of the number of extant tokens on the first blockchain 122 and the second blockchain 124 were performed as an on-chain process. To calculate the number of extant tokens on the first blockchain 122, chain status monitor 116 can pull, from the first blockchain 122, records of each transaction executed on the first blockchain 122 in respect of the native tokens bridged to the second blockchain 124 (e.g., records generated by the minting parties associated with establishing the bridged token on the second blockchain 124). Generally, because the bridged tokens may be involved in various transactions on the second blockchain 124 while leaving the native tokens on the first blockchain 122 static, the records retrieved from the first blockchain 122 in respect of the native tokens bridged to the second blockchain 124 may include token minting transactions and token burning transactions. A total number of extant native tokens on the first blockchain 122 may be calculated, for example, based on the difference between a total number of tokens minted on the first blockchain 122 and a total number of tokens burned on the first blockchain 122.

Similarly, to calculate the number of extant bridged tokens on the first blockchain 122, chain status monitor 116 can pull, from the second blockchain 124, records of transactions executed on the second blockchain 124. In some aspects, because operations that do not involve minting or burning bridged tokens (e.g., transfers of tokens between different wallets) may be performed on the second blockchain 124, the chain status monitor 116 can retrieve a subset of transaction records, including only transaction records associated with minting and burning bridged tokens, from the second blockchain 124 for analysis. The chain status monitor 116 can calculate the total number of extant bridged tokens on the second blockchain 124, for example, based on the difference between a total number of bridged tokens minted on the second blockchain 124 and a total number of bridged tokens burned on the second blockchain 124.

In some aspects, chain status monitor 116 may initially calculate the total number of extant native tokens on the first blockchain 122 and the total number of extant bridged tokens on the second blockchain 124 after a threshold amount of time has elapsed from bridge pauser 112 pausing the bridge 126 that allows for tokens to be minted and bridged between the first blockchain 122 and the second blockchain 124. By allowing an amount of time to elapse before performing an initial calculation of the total number of extant tokens, chain status monitor 116 can allow for pending minting and burning transactions to be completed, and for the records of those transactions to be committed to the first blockchain 122 and the second blockchain 124, before determining the total number of extant tokens on each of these blockchains. Generally, as a precondition for upgrading a token from a bridged token to a native token, the number of extant native tokens on the first blockchain 122 and the number of extant bridged tokens on the second blockchain 124 should match; if there is a discrepancy between the number of extant native tokens on the first blockchain 122 and the number of extant bridged tokens on the second blockchain 124, chain status monitor 116 can determine that the second blockchain 124 is not in an upgradable state, and thus may terminate an upgrade process, as discussed in further detail below.

Similarly, the total number of extant native tokens on the first blockchain 122 and the number of extant bridged tokens on the second blockchain 124 should remain unchanged during the upgrade process. To ensure that the total number of extant native tokens on the first blockchain 122 and the number of extant bridged tokens on the second blockchain 124 has remained static, chain status monitor 116 can periodically re-calculate these totals and compare the re-calculated total numbers of extant tokens to the initial calculations performed after bridge pauser 112 paused the bridge between the first blockchain 122 and the second blockchain 124. If the total number of extant native tokens on the first blockchain 122 and the number of extant bridged tokens on the second blockchain 124 has changed from the initial calculated number of extant tokens on the first blockchain 122 and second blockchain 124, chain status monitor 116 can determine that potentially malicious activity has occurred and thus that the second blockchain 124 is not in an upgradable state.

In some aspects, chain status monitor 116 may also or alternatively monitor permissions or privileges granted to various parties with respect to operations on the second blockchain 124 to determine whether the second blockchain 124 is in an upgradable state. Generally, in order for the second blockchain 124 to be in an upgradable state, the permissions or privileges granted to various parties with respect to operations on the second blockchain 124 should remain unchanged after permission adjuster 114 adjusts the privileges on the second blockchain 124 (e.g., to transfer minting, blocking, rescuing, and blocklisting privileges to a party associated with token upgrade system 110 and to set the bridge 126 as a zero-allowance minter). That is, after permission to mint tokens on the second blockchain 124 have been transferred to a party associated with the token upgrade system 110, no new parties should be allowed to mint tokens on the second blockchain 124. If a new party is allowed to mint tokens on the second blockchain 124, a loss of trust event has occurred, and thus, the token upgrade system 110 can determine that the second blockchain 124 is not in an upgradable state.

In some aspects, to monitor the grant of permissions or privileges with respect to operations on the second blockchain 124, a public counter may be maintained for each permissioned (or privileged) role. The public counter may, for example, be a monotonically increasing counter, or a counter that increases each time a permission or operational privilege is granted to a new party or transferred between parties. During the upgrade process, and after permissions or privileges are granted to the party associated with the token upgrade system, the public counter associated with each permissioned (or privileged) role should remain unchanged. If the public counter for any role changes during the upgrade process, chain status monitor 116 can determine that the second blockchain 124 is not in an upgradable state.

Token upgrader 118 generally executes various smart contracts or other commands on the second blockchain 124 to upgrade contracts defining a token on the second blockchain 124 from a bridged token to a native token. Upgrading a token from a bridged token to a native token on the second blockchain 124 may generally be based on whether chain status monitor 116 and/or token upgrader 118 has determined whether the second blockchain is in an upgradable state.

In some aspects, token upgrader 118 may perform various checks on the contracts deployed to the second blockchain 124 that define the bridged tokens in order to determine whether the second blockchain 124 is in an upgradable state. To do so, the token upgrader 118 may, in some aspects, verify that the bridged token is implemented on the second blockchain 124 according to a defined standard. This defined standard may specify, for example, that a token contract used to deploy a bridged token on the second blockchain 124 is an exact match to a defined contract or set of contracts. In another example, the defined standard may specify that a token contract used to deploy a bridged token on the second blockchain 124 is operationally a match to a defined contract or set of contracts. If token upgrader 118 determines that a token contract used to deploy a bridged token on the second blockchain 124 complies with the defined standard, token upgrader 118 can determine that the second blockchain 124 is in an upgradable state; otherwise, token upgrader 118 can determine that the second blockchain is not in an upgradable state.

If the second blockchain 124 is determined to be in an upgradable state, token upgrader 118 generally performs one or more actions to convert the bridged tokens on the second blockchain 124 to native tokens on the second blockchain 124. Generally, as part of the upgrade process, the total supply of native tokens should remain unchanged from a pre-upgrade state to a post-upgrade state. Thus, token upgrader 118 can initially perform burn operations with respect to the native tokens on the first blockchain 122 to destroy the native tokens previously minted on the first blockchain 122. If the number of native tokens burned on the first blockchain 122 matches an expected number of burned tokens (e.g., matches the total number of extant native tokens on the first blockchain 122 calculated by chain status monitor 116), token upgrader 118 can determine that the burn operation was successful and can terminate bridge 126. Subsequently, token upgrader 118 can transfer blocklisted entities to the smart contract defining the tokens on the second blockchain 124. At this point, because permission adjuster 114 has transferred ownership and other permissioned roles to a party associated with the token upgrade system 110, burned corresponding tokens on the first blockchain 122, and terminated the bridge 126 between the first blockchain 122 and the second blockchain 124, the bridged tokens on the second blockchain 124 are now native tokens on the second blockchain 124, and new native tokens (which are interchangeable with the previously minted and converted tokens on the second blockchain 124) may be minted on the second blockchain 124 by the party associated with the token upgrade system 110.

In some aspects, after token upgrader 118 converts the bridged tokens on the second blockchain 124 to native tokens on the second blockchain 124, the token upgrader 118 can execute one or more tests to verify that the party associated with the token upgrade system can perform various operations in respect of these native tokens on the second blockchain 124 (e.g., mint new tokens, burn redeemed tokens, recover tokens erroneously sent to another user of the second blockchain 124, block or unblock addresses from receiving or transferring tokens, etc.). If token upgrader 118 determines that the token upgrade system 110 can successfully perform these operations in respect of native tokens on the second blockchain 124, the token upgrade process may be considered to be completed. Otherwise, token upgrader 118 can perform various adjustments to permissions or privileges to attempt to reach a state in which the party associated with the token upgrade system 110 has all the privileges needed to control the issuance and use of a native token on the second blockchain 124.

If, however, the second blockchain 124 is determined to not be in an upgradable state, the operations performed by permission adjuster 114 and bridge pauser 112 may be reversed to allow for bridged tokens to continue to be minted on the second blockchain 124 without any changes having been made. In some aspects, transactions executed on the first blockchain 122 and the second blockchain 124 may be pre-signed transactions that restore the permissions or privileges granted to the token upgrade system 110 to the parties which originally held such permissions or privileges. After restoring privileges to the parties to the pre-upgrade parties, token upgrader 118 can unpause the bridge 126, and pre-upgrade minting and burning transactions may be resumed on the first blockchain 122 and the second blockchain 124.

Example Upgrading Bridged Tokens to Native Tokens

Figure 2:
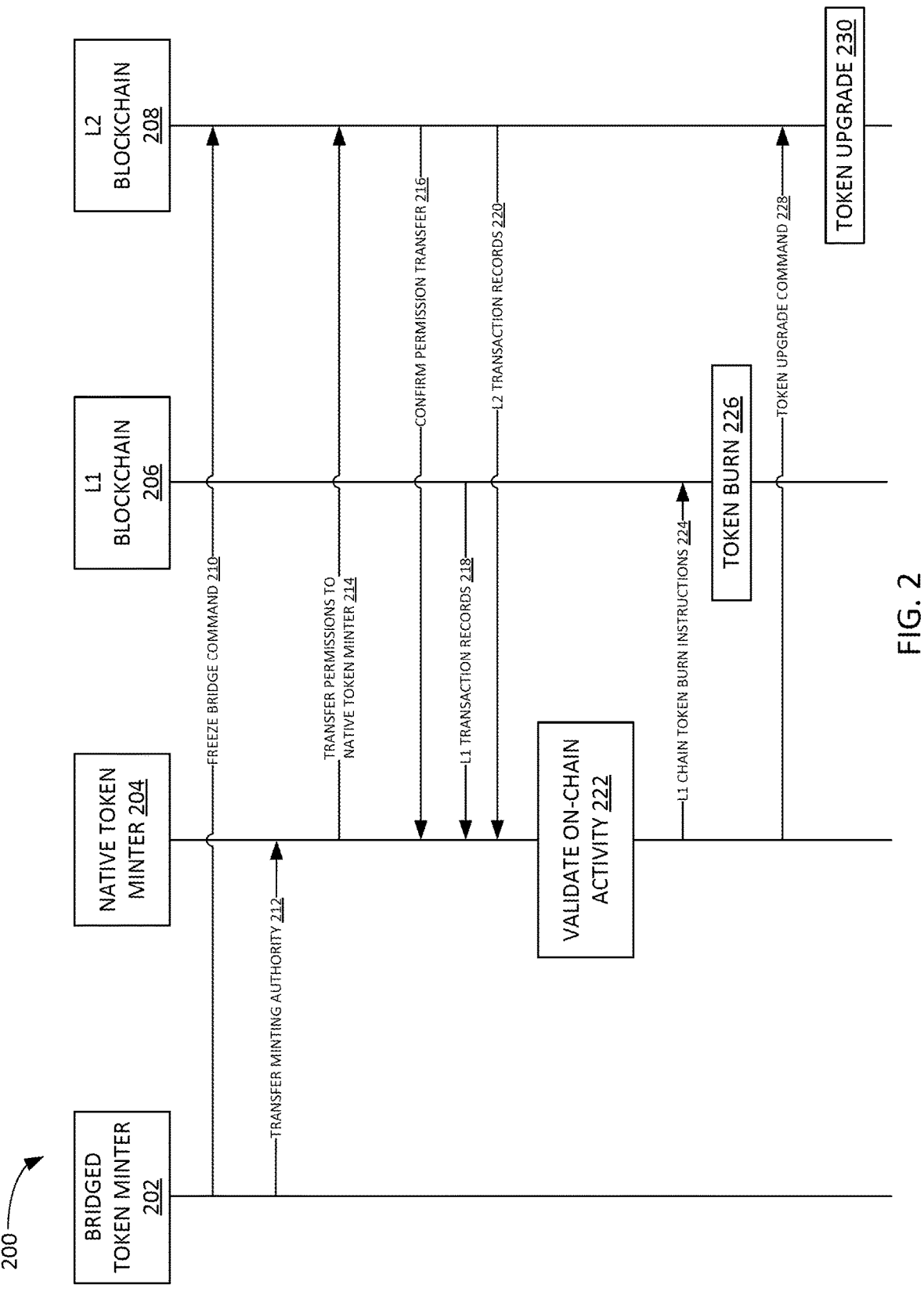
FIG. 2 is a message flow diagram illustrating messages exchanged between a token minters, a first blockchain, and a second blockchain for converting bridged tokens to native tokens on a blockchain, according to aspects of the present disclosure.

FIG. 2 is a message flow diagram 200 illustrating messages exchanged between a messages exchanged between a bridged token minter 202, a native token minter 204, a first blockchain 206, and a second blockchain 208 for converting bridged tokens to native tokens on a blockchain, according to aspects of the present disclosure. The native token minter 204 may correspond, for example, to token upgrade system 110 illustrated in FIG. 1. The L1 blockchain 206 may correspond to the first blockchain 122 illustrated in FIG. 1, and the L2 blockchain 208 may correspond to the second blockchain 124 illustrated in FIG. 1.

To effectuate an upgrade of bridged tokens on the second blockchain 208 to native tokens on the second blockchain 208, the bridged token minter 202 can emit a command 210 to freeze a bridge between the L1 blockchain 206 and the L2 blockchain 208. As discussed, this bridge (e.g., bridge 126 discussed above with respect to FIG. 1) may be established between the L1 blockchain 206 and the L2 blockchain 208 to effectuate the minting and burning of bridged tokens. Generally, a native token may be minted on the L1 blockchain 206, and the native token may be bridged to the L2 blockchain 208. Subsequently, the bridged token can be transferred in transactions between parties on the L2 blockchain 208. To ensure consistency and that no additional bridged tokens can be created during the upgrade process, the bridge can be frozen. However, as discussed above, the bridge may not be terminated until after an upgrade process is completed so that, in the event that malicious or potentially malicious activity is detected on the L2 blockchain 208, the upgrade process can be rolled back.

Subsequently, bridged token minter 202 can transfer minting authority 212 to the native token minter 204. To transfer minting authority 212 to the native token minter 204, in some aspects, bridged token minter 202 can provide information about the contracts defining a bridged token to L2 blockchain 208 and, in some aspects, allow the native token minter 204 to execute various operations to revoke minting and other privileges from bridged token minter 202 to native token minter 204. In some aspects, in transferring minting authority 212 to the native token minter 204, bridged token minter 202 may be re-configured as a zero-allowance minter, or a minter that is allowed to burn tokens but is not allowed to mint tokens. As discussed above, by re-configuring the bridged token minter 202 as a zero-allowance minter, the bridged token minter 202 can burn the native tokens originally minted on L1 blockchain 206 as part of an upgrade process.

Native token minter 204 can subsequently invoke one or more commands on the L2 blockchain 208 to transfer 214 permissions to the native token minter 204. Generally, these commands may allow for minting, pausing, recovery, and blocklisting privileges to be transferred to the native token minter 204 or a party associated with the native token minter 204. After the transfer of these privileges to the native token minter 204, parties associated with the bridged token minter should have no additional privileges in respect of operations on L2 blockchain 208. L2 blockchain 208 can subsequently respond with a confirmation 216 of permission transfers from the bridged token minter 202 to the native token minter 204.

Subsequently, as illustrated, the L1 blockchain 206 can provide L1 transaction records 218 to the native token minter 204, and the L2 blockchain 208 can provide L2 transaction records 220 to the native token minter 204. At block 222, the native token minter 204 uses the L1 transaction records 218 and the L2 transaction records 220 to validate on-chain activity at block 222. Generally, as discussed above, validation of on-chain activity may generally include ensuring that the number of extant native tokens on the L1 blockchain 206 match the number of extant bridged tokens on the L2 blockchain 208 and that, during the upgrade process, no new tokens have been minted (e.g., implying that an unknown party has permission to perform minting operations on the L2 blockchain, and thus that there has been a breach in trust between the party associated with bridged token minter 202 and the party associated with native token minter 204).

If the on-chain activity is validated at block 222, the native token minter 204 can issue L1 chain token burn instructions 224 to L1 blockchain 206 (e.g., via a bridge between the L1 blockchain 206 and an L2 blockchain 208 or some other zero-allowance minter having privileges to burn tokens on the L1 blockchain 206). Based on receipt of L1 chain token burn instructions 224, a smart contract or other programmatic code is executed on L1 blockchain 206 to destroy the native tokens minted on the L1 blockchain and corresponding to the bridged tokens on the L2 blockchain 208.

After burning the tokens on the L1 blockchain, the native token minter 204 issues a token upgrade command 228 to the L2 blockchain 208. In some aspects, the token upgrade command 228 may include information identifying updated logic for a smart contract deployed on the L2 blockchain 208 for minting tokens on the L2 blockchain 208. The updated logic may, for example, correspond to logic deployed for use in minting, burning, and controlling transactions on other blockchains on which native token minter 204 can mint native tokens. At block 230, the L2 blockchain 208 executes a token upgrade process, which finalizes the conversion of extant bridged tokens on the L2 blockchain to native tokens and allows native token minter 204 to mint, burn, and control the usage of tokens on the L2 blockchain.

Example Operations for Upgrading Bridged Tokens to Native Tokens on a Blockchain FIG. 3 illustrates example operations 300 for upgrading bridged tokens (e.g., tokens on which a native token exists on a first blockchain and are bridged to a second blockchain, such as first blockchain 122 and second blockchain 124 illustrated in FIG. 1 and/or, L1 blockchain 206 and L2 blockchain 208 illustrated in FIG. 2) to native tokens on a blockchain, according to aspects of the present disclosure. Operations 300 may be performed, for example, by a token upgrade system 110 illustrated in FIG. 1 or other processing system that can coordinate upgrading tokens from bridged tokens to native tokens on a blockchain.

As illustrated, operations 300 begin at block 310, with pausing a token bridge between a first blockchain and a second blockchain. As discussed, a token bridge may be established between the first blockchain and the second blockchain to effectuate the creation of bridged tokens. To do so, a native token is generally minted on the first blockchain, and the bridge can be used to mint a corresponding bridged token on the second blockchain. Subsequent transactions involving the bridged token may be performed on the second blockchain without performing corresponding transactions on the first blockchain. In pausing the token bridge between the first blockchain and the second blockchain, the minting of bridged tokens may effectively be paused so that new tokens cannot be minted during the upgrade process without breaking trust and causing an upgrade process to be terminated.

In some aspects, pausing the token bridge between the first blockchain and the second blockchain may include locking a quantity of extant tokens on the first blockchain and a corresponding quantity of extant bridged tokens on the second blockchain. Pending transactions using the bridged token on the first blockchain and the second blockchain may be finalized.

At block 320, operations 300 proceed with adjusting minting privileges on the second blockchain such that a designated user is granted privileges to control token minting on the second blockchain and no other users are allowed to control token minting on the second blockchain. In some aspects, these minting privileges may include privileges to mint, burn, recover, and own tokens on the second blockchain.

In some aspects, adjusting minting privileges on the second blockchain may include revoking at least minting privileges from parties other than the designated user and granting zero-allowance minting privileges to a designated token burning entity. The designated token burning entity may be, for example, a smart contract associated with the token bridge that was previously frozen.

In some aspects, zero-allowance minting privileges may be revoked from the designated token burning entity subsequent to converting the bridged token to the native token existing on the second blockchain (e.g., as discussed in further detail below with respect to block 340 of operations 300).

At block 330, operations 300 proceed with validating that a quantity of a bridged token has remained unchanged since a freeze time at which the token bridge was paused. As discussed, to validate that a quantity of a bridged token has remained unchanged since a freeze time at which the token bridge was paused, transaction records can be retrieved from the first blockchain and the second blockchain periodically (e.g., while other checks are performed to ensure that the second blockchain is in an upgradable state). A total number of extant tokens on the first blockchain and a corresponding total number of extant bridged tokens on the second blockchain may be calculated based on the transaction records retrieved from the first blockchain and the second blockchain, and these totals can be compared to totals calculated at the freeze time (or after a threshold amount of time has elapsed from the freeze time, to account for minting and burning transactions that may have been pending at the time the bridge was frozen).

At block 340, operations 300 proceed with converting the bridged token to a native token existing on the second blockchain based on validating that the quantity of the bridged token has remain unchanged since the freeze time.

In some aspects, converting the bridged token to a native token existing on the second blockchain comprises executing one or more update operations defined in a smart contract to convert the bridged token to the native token.

In some aspects, converting the bridged token to a native token existing on the second blockchain comprises burning tokens on the first blockchain corresponding to the bridged token on the second blockchain.

In some aspects, operations 300 may further include retrieving, from the first blockchain and the second blockchain, transaction records related to transactions using the bridged token. A quantity of extant tokens on the first blockchain may be calculated based on the transaction records retrieved from the first blockchain, and a quantity of extant bridged tokens on the second blockchain may be calculated based on the transaction records retrieved from the second blockchain. A verification process may be performed to verify that the quantity of extant tokens on the first blockchain matches the quantity of extant bridged tokens on the second blockchain. In some aspects, converting the bridged token to the native token may be further based on verifying that the quantity of extant tokens on the first blockchain matches the quantity of extant bridged tokens on the second blockchain.

In some aspects, operations 300 may further include validating a contract defining the bridged token against one or more reference contracts. Converting the bridged token to the native token may be further based on validating the contract.

In some aspects, operations 300 may further include restoring minting privileges to other users on the second blockchain and unpausing the token bridge between the first blockchain and the second blockchain based on failing to validate that the quantity of the bridged token has remained unchanged since the freeze time.

Figure 4:
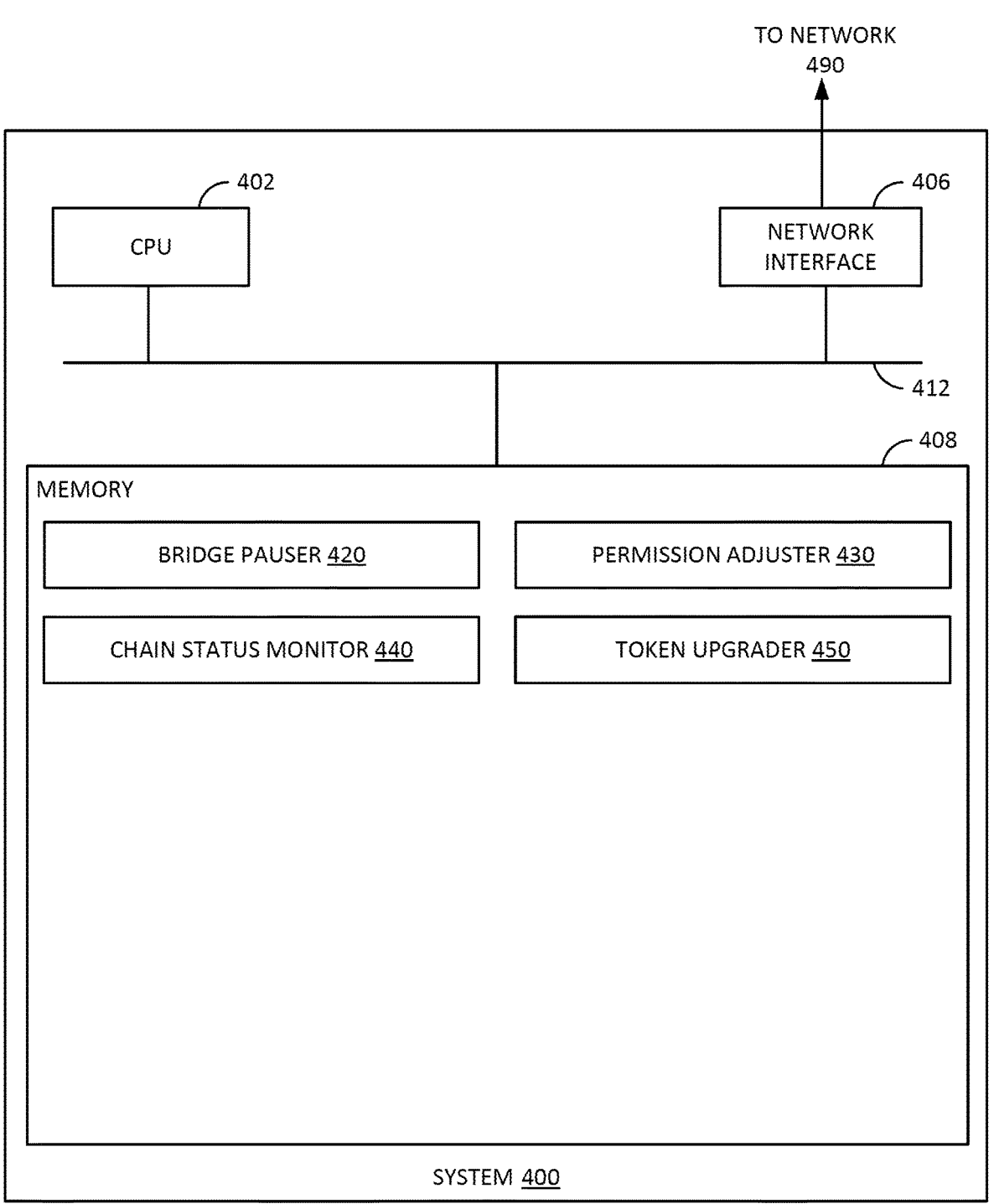
FIG. 4 illustrates an example system on which embodiments of the present disclosure can be performed.

Example System for Upgrading Bridged Tokens to Native Tokens on a Blockchain FIG. 4 illustrates an example system 400 configured to perform the methods described herein, including, for example, operations 300 of FIG. 3. In some embodiments, system 400 may act as a token upgrade system through which bridged tokens are upgraded to native tokens on a blockchain, such as token upgrade system 110 illustrated in FIG. 1.

As shown, system 400 includes a central processing unit (CPU) 402, network interface 406 through which system 400 is connected to network 490 (which may be a local network, an intranet, the internet, or any other group of computing devices communicatively connected to each other), a memory 408, and an interconnect 412. The network interface 406 may be used to receive requests to upgrade bridged tokens on a blockchain to native tokens on the blockchain (e.g., as depicted and described with respect to FIGS. 1 through 3.

CPU 402 may retrieve and execute programming instructions stored in the memory 408. Similarly, the CPU 402 may retrieve and store application data residing in the memory 408. The interconnect 412 transmits programming instructions and application data, among the CPU 402, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a bridge pauser 420, permission adjuster 430, chain status monitor 440, and token upgrader 450.

Bridge pauser 420 generally corresponds to bridge pauser 112 illustrated in FIG. 1. Generally, bridge pauser 420 can pause a bridge (e.g., bridge 126 illustrated in FIG. 1) between a first blockchain (e.g., first blockchain 122 illustrated in FIG. 1) and a second blockchain (e.g., second blockchain 124 illustrated in FIG. 1) to effectuate a supply lock on bridged tokens existing on the second blockchain. Generally, by pausing the bridge, tokens minted on the first blockchain may not be bridged over to the second blockchain; likewise, burning a token on the first blockchain may not cause a corresponding token on the second blockchain to be burned.

Permission adjuster 430 generally corresponds to permission adjuster 114 illustrated in FIG. 1. Generally, permission adjuster 430 adjusts permissions granted in respect of tokens on the second blockchain so that a designated party is granted privileges to control token minting on the second blockchain and no other parties are allowed to control token minting on the second blockchain. To do so, permissions (or privileges) to mint, burn, recover, and control the usage of tokens on the second blockchain may be transferred from other minting parties to the designated party. Permission adjuster 430 can additionally reset the privileges of a party, such as a bridge between a first blockchain and a second blockchain, to zero-allowance minting, which allows that party to burn, but not to mint, tokens on the first blockchain.

Chain status monitor 440 generally corresponds to chain status monitor 116 illustrated in FIG. 1. Generally, chain status monitor 440 monitors transaction records on the first blockchain and the second blockchain to ensure that the second blockchain is in an upgradable state. In monitoring transaction records on the first blockchain and the second blockchain, chain status monitor 440 can ensure that the number of extant native tokens on the first blockchain matches the number of extant bridged tokens on the second blockchain. Chain status monitor 440 can also periodically check the number of extant native tokens and bridged tokens during the upgrade process to ensure that no new tokens have been minted and that no extant tokens have been burned, which, as discussed above, should not occur after the transfer of minting privileges to the designated party. In some aspects, chain status monitor 440 can also monitor for the transfer or grant of privileges in respect of tokens on the second blockchain to other parties. If chain status monitor 440 detects that minting privileges have been granted to another party during the upgrade process, chain status monitor 440 can determine that trust has been broken and thus that the second blockchain is not in an upgradable state.

Token upgrader 450 generally corresponds to token upgrader 118 illustrated in FIG. 1. Generally, token upgrader 450 performs various actions to upgrade a bridged token to a native token on a second blockchain based on a determination by chain status monitor 440 that the second blockchain is in an upgradable state. To upgrade a bridged token to a native token, token upgrader 450 can cause the designated zero-allowance minter to burn extant native tokens on the first blockchain and can execute various operations to update a smart contract defining a token deployed on the second blockchain to convert a bridged token to a native token. After updating the bridged token to a native token on the second blockchain, new native tokens, interchangeable with the updated tokens, may be minted, burned, and used in transactions performed on the second blockchain.

EXAMPLE CLAUSES

Implementation details for various aspects of the present disclosure are described in the following numbered clauses.

Clause 1: A processor-implemented method, comprising: pausing a token bridge between a first blockchain and a second blockchain; adjusting minting privileges on the second blockchain such that a designated user is granted privileges to control token minting on the second blockchain and no other users are allowed to control token minting on the second blockchain; validating that a quantity of a bridged token has remained unchanged since a freeze time at which the token bridge was paused; based on validating that the quantity of the bridged token has remained unchanged since the freeze time, converting the bridged token to a native token existing on the second blockchain.

Clause 2: The method of Clause 1, wherein pausing the token bridge between the first blockchain and the second blockchain comprises: locking a quantity of extant tokens on the first blockchain and a corresponding quantity of extant bridged tokens on the second blockchain; and finalizing pending transactions using the bridged token on the first blockchain and the second blockchain.

Clause 3: The method of any of Clauses 1 or 2, further comprising: retrieving, from the first blockchain and the second blockchain, transaction records related to transactions using the bridged token; calculating a quantity of extant tokens on the first blockchain based on the transaction records retrieved from the first blockchain; calculating a quantity of extant bridged tokens on the second blockchain based on the transaction records retrieved from the second blockchain; and verifying that the quantity of extant tokens on the first blockchain matches the quantity of extant bridged tokens on the second blockchain.

Clause 4: The method of Clause 3, wherein converting the bridged token to the native token is further based on verifying that the quantity of extant tokens on the first blockchain matches the quantity of extant bridged tokens on the second blockchain.

Clause 5: The method of any of Clauses 1 through 4, further comprising: validating a contract defining the bridged token against one or more reference contracts, wherein converting the bridged token to the native token is further based on validating the contract.

Clause 6: The method of any of Clauses 1 through 5, further comprising: based on failing to validate that the quantity of the bridged token has remained unchanged since the freeze time, restoring minting privileges to other users on the second blockchain and unpausing the token bridge between the first blockchain and the second blockchain.

Clause 7: The method of any of Clauses 1 through 6, wherein adjusting minting privileges on the second blockchain comprises: revoking at least minting privileges from parties other than the designated user; and granting zero-allowance minting privileges to a designated token burning entity.

Clause 8: The method of Clause 7, wherein the designated token burning entity comprises a smart contract associated with the token bridge.

Clause 9: The method of any of Clauses 7 or 8, further comprising revoking zero-allowance minting privileges from the designated token burning entity subsequent to converting the bridged token to the native token existing on the second blockchain.

Clause 10: The method of any of Clauses 1 through 9, wherein converting the bridged token to a native token existing on the second blockchain comprises executing one or more update operations defined in a smart contract to convert the bridged token to the native token.

Clause 11: The method of any of Clauses 1 through 10, wherein converting the bridged token to a native token existing on the second blockchain comprises burning tokens on the first blockchain corresponding to the bridged token on the second blockchain.

Clause 12: A system, comprising: a memory having executable instructions stored thereon; and a processor configured to execute the executable instructions to perform the operations of any one of Clauses 1 through 11.

Clause 13: A system, comprising: means for performing the operations of any one of Clauses 1 through 11.

Clause 14: A computer-readable medium having instructions stored thereon which, when executed by a processor, performs the operations of any one of Clauses 1 through 11.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
pausing a token bridge between a first blockchain and a second blockchain;
adjusting minting privileges on the second blockchain by:
granting a designated user exclusive privileges to control token minting on the second blockchain,
revoking at least minting privileges from parties other than the designated user, and
granting zero-allowance minting privileges to a designated token burning entity;
validating that a quantity of a bridged token has remained unchanged since a freeze time at which the token bridge was paused;
based on validating that the quantity of the bridged token has remained unchanged since the freeze time, converting the bridged token to a native token existing on the second blockchain; and
revoking zero-allowance minting privileges from the designated token burning entity subsequent to converting the bridged token.

2. The method of claim 1, wherein pausing the token bridge between the first blockchain and the second blockchain comprises:
locking a quantity of extant tokens on the first blockchain and a corresponding quantity of extant bridged tokens on the second blockchain; and
finalizing pending transactions using the bridged token on the first blockchain and the second blockchain.

3. The method of claim 1, further comprising:
retrieving, from the first blockchain and the second blockchain, transaction records related to transactions using the bridged token;
calculating a quantity of extant tokens on the first blockchain based on the transaction records retrieved from the first blockchain;
calculating a quantity of extant bridged tokens on the second blockchain based on the transaction records retrieved from the second blockchain; and
verifying that the quantity of extant tokens on the first blockchain matches the quantity of extant bridged tokens on the second blockchain.

4. The method of claim 3, wherein converting the bridged token to the native token is further based on verifying that the quantity of extant tokens on the first blockchain matches the quantity of extant bridged tokens on the second blockchain.

5. The method of claim 1, further comprising:
validating a contract defining the bridged token against one or more reference contracts, wherein converting the bridged token to the native token is further based on validating the contract.

6. The method of claim 1, further comprising:
based on failing to validate that the quantity of the bridged token has remained unchanged since the freeze time, restoring minting privileges to other users on the second blockchain and unpausing the token bridge between the first blockchain and the second blockchain.

7. The method of claim 1, wherein the designated token burning entity comprises a smart contract associated with the token bridge.

8. The method of claim 1, wherein converting the bridged token to a native token existing on the second blockchain comprises executing one or more update operations defined in a smart contract to convert the bridged token to the native token.

9. The method of claim 1, wherein converting the bridged token to a native token existing on the second blockchain comprises burning tokens on the first blockchain corresponding to the bridged token on the second blockchain.

10. A processing system, comprising:
a memory having executable instructions stored thereon; and
one or more processors configured to execute the executable instructions in order to cause the processing system to:
pause a token bridge between a first blockchain and a second blockchain;
adjust minting privileges on the second blockchain by:
granting a designated user exclusive privileges to control token minting on the second blockchain;
revoking at least minting privileges from parties other than the designated user, and
granting zero-allowance minting privileges to a designated token burning entity;
validate that a quantity of a bridged token has remained unchanged since a freeze time at which the token bridge was paused;
convert, based on validating that the quantity of the bridged token has remained unchanged since the freeze time, the bridged token to a native token existing on the second blockchain; and
revoke zero-allowance minting privileges from the designated token burning entity subsequent to converting the bridged token.

11. The processing system of claim 10, wherein to pause the token bridge between the first blockchain and the second blockchain, the one or more processors are configured to cause the processing system to:

lock a quantity of extant tokens on the first blockchain and a corresponding quantity of extant bridged tokens on the second blockchain; and finalize pending transactions using the bridged token on the first blockchain and the second blockchain.

12. The processing system of claim 10, wherein the one or more processors are further configured to cause the processing system to:

retrieve, from the first blockchain and the second blockchain, transaction records related to transactions using the bridged token;

calculate a quantity of extant tokens on the first blockchain based on the transaction records retrieved from the first blockchain;

calculate a quantity of extant bridged tokens on the second blockchain based on the transaction records retrieved from the second blockchain; and verify that the quantity of extant tokens on the first blockchain matches the quantity of extant bridged tokens on the second blockchain.

13. The processing system of claim 12, wherein the one or more processors are configured to convert the bridged token to the native token further based on verifying that the quantity of extant tokens on the first blockchain matches the quantity of extant bridged tokens on the second blockchain.

14. The processing system of claim 10, wherein the one or more processors are further configured to cause the processing system to:

validate a contract defining the bridged token against one or more reference contracts, wherein the one or more processors are configured to cause the processing system to convert the bridged token to the native token is further based on validating the contract.

15. The processing system of claim 10, wherein the one or more processors are further configured to cause the processing system to:

based on failing to validate that the quantity of the bridged token has remained unchanged since the freeze time, restore minting privileges to other users on the second blockchain and unpause the token bridge between the first blockchain and the second blockchain.

16. The processing system of claim 10, wherein the designated token burning entity comprises a smart contract associated with the token bridge.

17. The processing system of claim 10, wherein to convert the bridged token to a native token existing on the second blockchain, the one or more processors are configured to cause the processing system to execute one or more update operations defined in a smart contract to convert the bridged token to the native token.

18. The processing system of claim 10, wherein to convert the bridged token to a native token existing on the second blockchain, the one or more processors are configured to cause the processing system to burn tokens on the first blockchain corresponding to the bridged token on the second blockchain.

19. A non-transitory computer-readable medium having executable instructions stored thereon which, when executed by one or more processors, causes the one or more processors to perform an operation comprising:

pausing a token bridge between a first blockchain and a second blockchain;

adjusting minting privileges on the second blockchain by:

granting a designated user exclusive privileges to control token minting on the second blockchain, revoking at least minting privileges from parties other than the designated user, and granting zero-allowance minting privileges to a designated token burning entity;

validating that a quantity of a bridged token has remained unchanged since a freeze time at which the token bridge was paused;

based on validating that the quantity of the bridged token has remained unchanged since the freeze time, converting the bridged token to a native token existing on the second blockchain; and revoking zero-allowance minting privileges from the designated token burning entity subsequent to converting the bridged token.

* * * * *